US012564912B2

(12) United States Patent
Mori

(10) Patent No.: US 12,564,912 B2
(45) Date of Patent: Mar. 3, 2026

(54) MACHINE TOOL AND CONTROL DEVICE FOR MANAGING A USAGE TIME OF A TOOL

(71) Applicant: FUJI CORPORATION, Chiryu (JP)

(72) Inventor: Masahiko Mori, Toyota (JP)

(73) Assignee: FUJI CORPORATION, Chiryu (JP)

( * ) Notice: Subject to any disclaimer, the term of this patent is extended or adjusted under 35 U.S.C. 154(b) by 507 days.

(21) Appl. No.: 18/249,308

(22) PCT Filed: Nov. 26, 2020

(86) PCT No.: PCT/JP2020/043932
§ 371 (c)(1),
(2) Date: Apr. 17, 2023

(87) PCT Pub. No.: WO2022/113223
PCT Pub. Date: Jun. 2, 2022

(65) Prior Publication Data
US 2023/0415291 A1      Dec. 28, 2023

(51) Int. Cl.
*B23Q 17/09*          (2006.01)
*B23B 3/30*           (2006.01)

(52) U.S. Cl.
CPC ............ *B23Q 17/0995* (2013.01); *B23B 3/30* (2013.01)

(58) Field of Classification Search
CPC ......... B23Q 17/0995; B23Q 2039/004; B23B 3/30; B23B 3/32; G05B 19/042; G05B 19/4187; G05B 2219/50313; Y10T 483/12; Y10T 483/138; B23P 23/02
See application file for complete search history.

(56) References Cited

U.S. PATENT DOCUMENTS

| | | | | |
|---|---|---|---|---|
| 5,244,447 A | * | 9/1993 | Tanaka ............... | G05B 19/4187 700/169 |
| 2005/0198793 A1 | * | 9/2005 | Ueda ....................... | B23B 3/168 29/27 C |

FOREIGN PATENT DOCUMENTS

| | | |
|---|---|---|
| JP | 5-192848 A | 8/1993 |
| JP | 5-285802 A | 11/1993 |
| JP | 8-215785 A | 8/1996 |
| JP | 2001-105265 A | 4/2001 |

OTHER PUBLICATIONS

International Search Report issued Feb. 9, 2021 in PCT/JP2020/043932 filed Nov. 26, 2020, 2 pages.

* cited by examiner

*Primary Examiner* — Eric J Yoon
(74) *Attorney, Agent, or Firm* — Oblon, McClelland, Maier & Neustadt, L.L.P.

(57)          ABSTRACT

A machine tool includes a tool main spindle device to execute machining of a first system in a first workpiece main spindle device for rotationally holding a workpiece and machining of a second system in a second workpiece main spindle device for rotationally holding the workpiece by an exchangeable main spindle head tool. Drive control of each device is performed by a control device, the control device including a tool management processing section to calculate a total usage time of the main spindle head tool based on the machining of the first system or the machining of the second system executed in the tool main spindle device, to store the calculated total usage time as first tool management data or second tool management data, and to rewrite the same total usage time in the other of the second tool management data or the first tool management data.

4 Claims, 5 Drawing Sheets

MACHINE TOOL AND CONTROL DEVICE FOR MANAGING A USAGE TIME OF A TOOL

TECHNICAL FIELD

The present disclosure relates to a machine tool for correctly determining a life of an identical tool used in machining of different systems.

BACKGROUND ART

In a machine tool having an automatic tool exchanging device, exchange of tools housed in a tool magazine is automatically performed according to a machining program. A tool number is assigned to each of multiple tools to be used, and tool information such as an offset value such as a length and a diameter of the tool, and a lifetime of the tool is managed. Patent Literature 1 below discloses a configuration in which a tool supply device housing multiple tools transfers tools to two machine tools. The control section of each machine tool reads a preparation command of a tool to be used in the next step before finishing of machining, and records information of the tool in the next step sent from an information management device. When the tool is exchanged, a time period obtained by subtracting a tool use time from the lifetime read by the control section of the machine tool is updated as new tool life information. Then, the information of the tool to be returned to the tool supply device is sent to the information management device, and the tool information in the tool information storage area is updated.

PATENT LITERATURE

Patent Literature 1: JP-A-H5-285802

BRIEF SUMMARY

Technical Problem

In the above conventional art, a tool in a common tool supply device is used for machining of a first system performed in a first machine tool and machining of the second system performed in a second machine tool, and the calculation of the tool life is performed in each of them. However, since the life determination cannot be performed individually, in the conventional art, the correct life determination of each tool is performed by collectively managing information such as the tool life by a common information management device. As described above, although it is necessary to perform correct life management for the same tool which performs the machining in different systems, it is also desired to perform correct life determination of the tool without providing, for example, the information management device as in the above-described conventional art.

Accordingly, an object of the present disclosure is to provide a machine tool for correctly determining the life of a tool used in machining of different systems in order to solve the above-mentioned problems.

Solution to Problem

According to an aspect of the present disclosure, there is provided a machine tool including a tool main spindle device configured to execute machining of a first system in a first workpiece main spindle device for rotationally holding a workpiece and machining of a second system in a second workpiece main spindle device for rotationally holding the workpiece by an exchangeable main spindle head tool, in which drive control of each device is performed by a control device, in which the control device has a tool management processing section configured to calculate a total usage time of the main spindle head tool based on the machining of the first system or the machining of the second system executed in the tool main spindle device, to store the calculated total usage time as first tool management data or second tool management data, and to rewrite the same total usage time in the other of the second tool management data and the first tool management data.

Advantageous Effects

With the above configuration, when the machining of the first system or the machining of the second system is executed by the tool main spindle device, the total usage time of the main spindle head tool calculated for each system is stored as one of the first tool management data or the second tool management data, but the total usage time of one of the first tool management data and the second tool management data is also rewritten in the other of the second tool management data or the first tool management data, so that a correct life determination can be made even for the main spindle head tool used in the machining of a different system.

DESCRIPTION OF EMBODIMENTS

Figure 1:
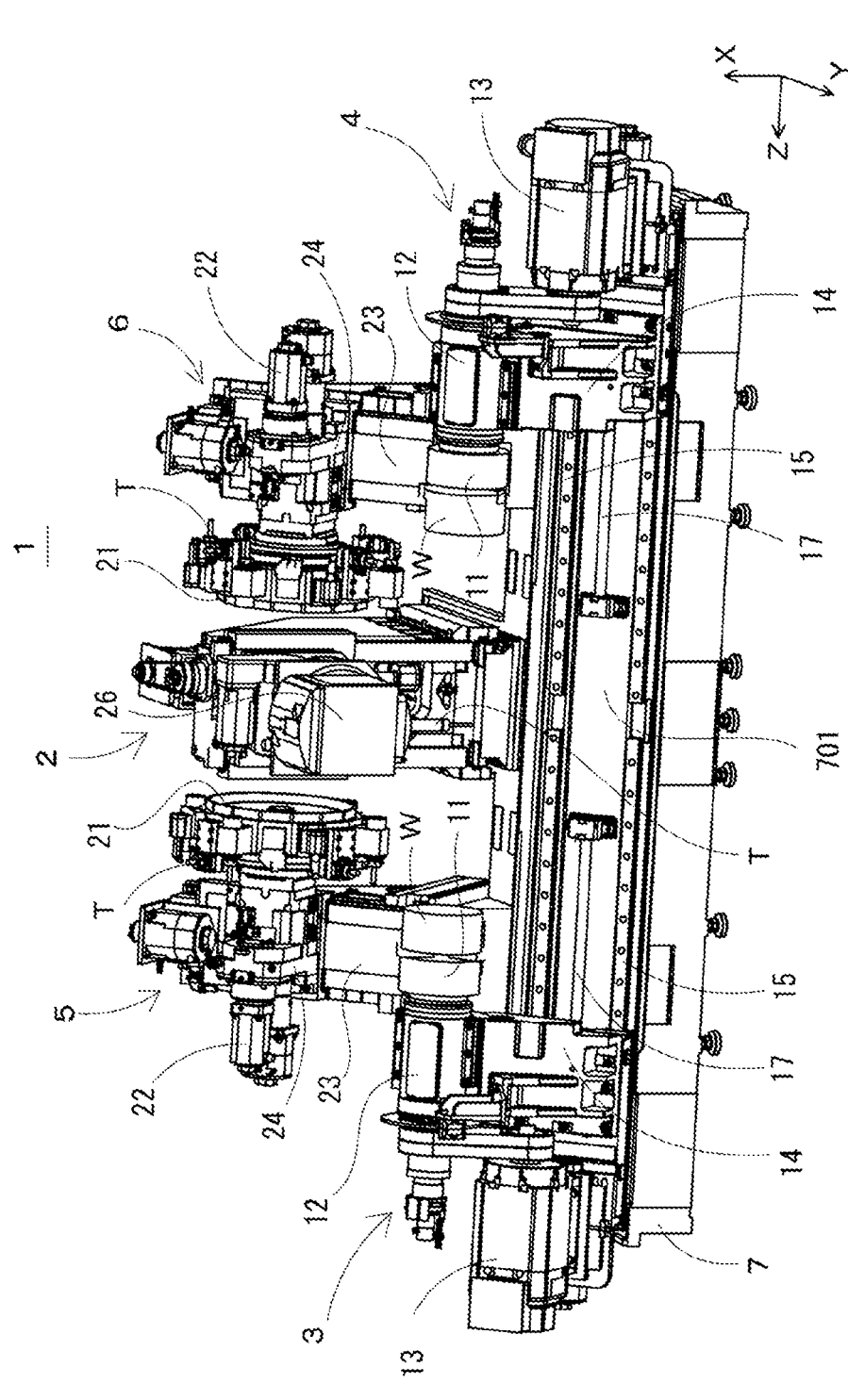
FIG. 1 is a perspective view illustrating a principal structure of a multifunctional machining machine that is an embodiment of a machine tool.

An embodiment of a machine tool according to the present disclosure will be described below with reference to the drawings. FIG. 1 is a perspective view illustrating a principal structure of a multifunctional machining machine that is an embodiment of a machine tool. Multifunctional machining machine 1 of the present embodiment is a machine tool having various machining devices so as to have both functions of an NC lathe and a machining center. Specifically, multifunctional machining machine 1 is an opposed biaxial lathe in which first workpiece main spindle device 3 and second workpiece main spindle device 4 for gripping workpiece W, and first turret device 5 and second turret device 6 having multiple tools T are disposed symmetrically with each other relative to a left-right direction, and in addition, tool main spindle device 2 is provided at a center of a machine body.

First and second workpiece main spindle devices 3 and 4 have the same structure, and a spindle is rotatably incorporated in main spindle stand 12, to which chuck mechanism 11 for gripping and releasing workpiece W to be machined is assembled. Chuck mechanism 11 is rotated by driving of spindle motor 13, so that workpiece W gripped by chuck mechanism 11 is subjected to phase determination during machining or rotation at a predetermined speed. Main spindle stand 12 and spindle motor 13 are mounted on main spindle slide 14. Main spindle slide 14 is slidable along guide rail 15 fixed to front inclined surface 701 of bed 7, and is configured to move in a Z-axis direction that is a width direction of the machine body by a ball screw mechanism of screw shaft 17 rotated by a Z-axis servo motor.

First turret device 5 and second turret device 6 have the same structure, and are configured such that multiple tools T (turret tools) are attached to turret 21 at equal intervals in a circumferential direction, so that any tool T can be positioned at a machining position on the circumference by rotational control of indexing servo motor 22. First and second turret devices 5 and 6 are provided with a drive mechanism configured to move turret 21 in two directions orthogonal to the Z-axis. Base slide 23 having a substantially triangular shape can slide upward at an oblique angle of 45 degrees ahead with respect to bed 7, and turret slide 24 on which turret 21 is mounted is assembled so as to be slidable downward at an oblique angle of 45 degrees ahead with respect to base slide 23. Base slide 23 and turret slide 24 are configured to be moved in respective directions by a ball screw mechanism of a screw shaft rotated by each servo motor.

Figure 2:
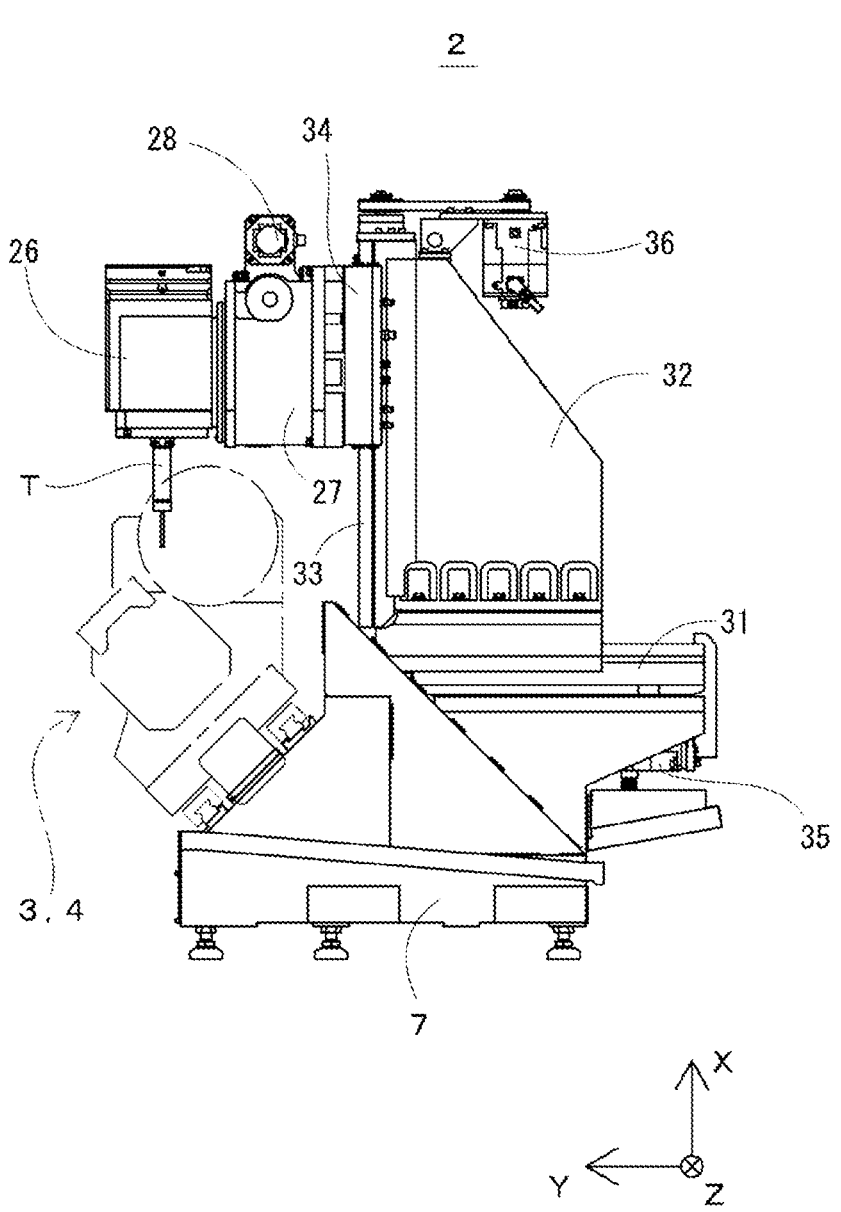
FIG. 2 is a side view illustrating a tool main spindle device.

FIG. 2 is a side view illustrating tool main spindle device 2. Tool main spindle device 2 is a built-in type device in which a servo motor for a main spindle and a tool spindle are incorporated in main spindle head 26, so that various tools T (main spindle head tools) are exchanged with tool mounting sections provided at a lower end portion of tool main spindle device 2. Main spindle head 26 is rotatably attached to main spindle slide 27, and is configured to transmit rotation of B-axis motor 28 via a rotation transmission mechanism. In tool main spindle device 2, guide rail 31 is fixed along a horizontal Y-axis in a front-rear direction of the machine body, and base slide 32 is slidably assembled to guide rail 31. In base slide 32, a rail portion 33 is fixed along a vertical X-axis in an up-down direction of a machine body on a front surface side, and main spindle slide 34 is slidably assembled to rail portion 33. Both base slide 32 and main spindle slide 34 are provided with a ball screw mechanism, so that main spindle head 26 is movable in each axial direction by driving of Y-axis servo-motor 35 or X-axis servo motor 36.

In multifunctional machining machine 1, the machining of workpiece W is separated into a first system on a left side and a second system on a right side of the drawing, so that tool main spindle device 2 located at the center can handle the machining of both the first system and the second system. The machining of the first system is machining in first turret device 5 and machining in tool main spindle device 2 with respect to workpiece W gripped by first workpiece main spindle device 3, and the machining of the second system is machining in second turret device 6 and machining in tool main spindle device 2 with respect to workpiece W gripped by second workpiece main spindle device 4.

Figure 3:
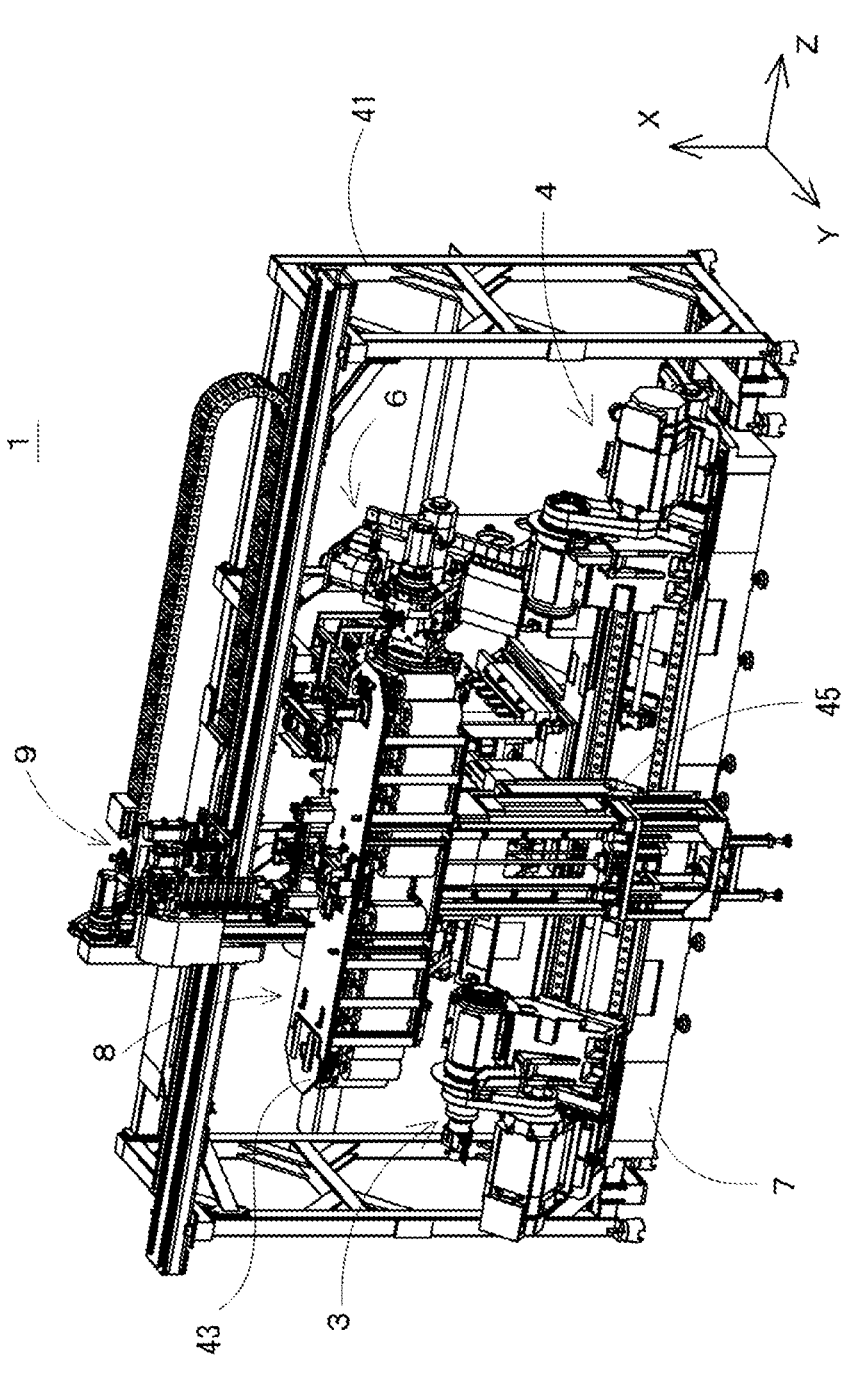
FIG. 3 is a perspective view of the multifunctional machining machine including an automatic tool exchanging device and a workpiece automatic conveyance device.

Next, FIG. 3 is a perspective view of multifunctional machining machine 1 to which automatic tool exchanging device 8 and workpiece automatic conveyance device 9 are added. In gantry-type workpiece automatic conveyance device 9, a slide base movable in the front-rear direction of the machine body is mounted on a traveling table movable in the width direction of the machine body on frame structure body 41, and a lifting and lowering arm having a chuck mechanism is assembled at a distal end portion thereof so as to be movable in the up-down direction. In multifunctional machining machine 1, workpiece W is conveyed by workpiece automatic conveyance device 9, is conveyed from an input stocker to first workpiece main spindle device 3, and further to second workpiece main spindle device 4, and is accommodated in an output stocker by the finishing of machining.

Automatic tool exchanging device 8 is for exchanging tool T in tool main spindle device 2, and multiple tools T corresponding to the machining of the first system and the second system are housed in tool magazine 43. In automatic tool exchanging device 8, tool magazine 43 is located above exchanging device main body 45, is erected by two support columns, and is supported by a frame structure body (not illustrated) coupled to bed 7. A tool changer for performing tool exchanging with respect to main spindle head 26 is provided in exchanging device main body 45, and a shift device for moving tool T between the tool changer and tool magazine 43 is further configured. The tool changer pivots a tool exchanging arm having chucks at both end portions to exchange tool T held by the shift device and main spindle head 26.

Figure 4:
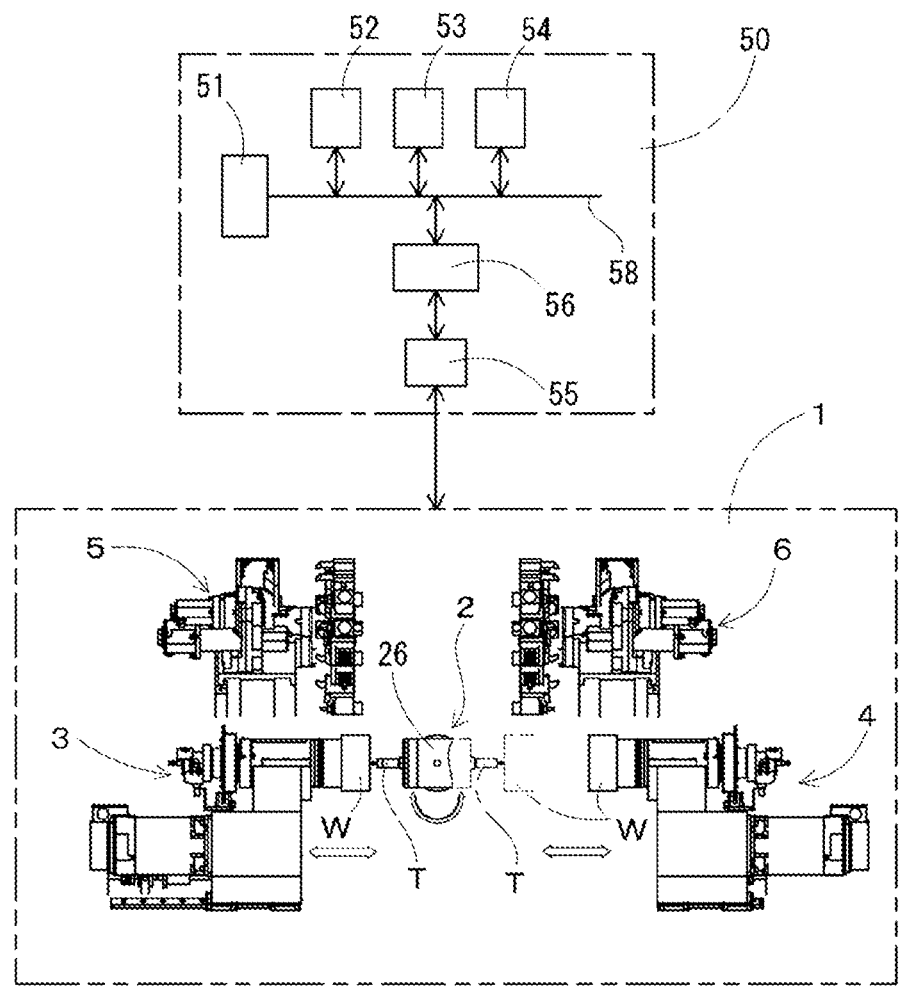
FIG. 4 is a diagram conceptually illustrating a control system of the multifunctional machining machine.

Multifunctional machining machine 1 automatically performs conveyance of workpiece W, machining, and tool exchanging. FIG. 4 is a diagram conceptually illustrating a control system of multifunctional machining machine 1. In control device 50 for driving multifunctional machining machine 1, microprocessor (CPU) 51, ROM 52, RAM 53, non-volatile memory 54, I/O unit 55, and the like are connected via bus line 58. CPU 51 collectively controls the entire control section, and ROM 52 stores system programs, control parameters, and the like executed by CPU 51, and RAM 53 temporarily stores calculation data and the like.

Volatile memory 54 is information necessary for processing performed by CPU 51, and stores information such as a machining program of multifunctional machining machine 1. Control device 50 is provided with programmable logic controller (PLC) 56 connected to I/O unit 55, and controls driving sections of various machining devices such as tool main spindle device 2 of multifunctional machining machine 1 by a sequence program generated in a ladder format. Each function command of the machining program is converted into a necessary signal by the sequence program, and is output from I/O unit 55 to tool main spindle device 2 or the like.

Multifunctional machining machine 1 executes workpiece machining in accordance with the machining program stored in control device 50. First, workpiece W of the input stocker is conveyed to first workpiece main spindle device 3 by the workpiece automatic conveyance device, and is gripped by chuck mechanism 11. In first turret device 5, tool T pivotally indexed by the driving of turret 21 is moved to a machining position with respect to workpiece W and positioned. In first workpiece main spindle device 3, workpiece W is rotated by the driving of spindle motor 13, workpiece W is moved in the Z-axis direction by the driving of the Z-axis servo motor, and predetermined machining is performed on workpiece W which tool T is brought to contact.

The machining of the first system with respect to workpiece W of first workpiece main spindle device 3 is performed not only by first turret device 5 but also by the addition of tool main spindle device 2 or only by tool main spindle device 2. In the machining of workpiece W by tool main spindle device 2, base slide 32 moves in the Y-axis direction, and main spindle slide 27 moves in the X-axis direction, so that tool T of main spindle head 26 is conveyed to the machining position of first workpiece main spindle device 3 with respect to workpiece W. Then, in main spindle head 26, tool T that is oriented vertically downward is tilted by the rotation of B-axis motor 28, so that predetermined machining such as drilling of workpiece W is performed.

After the machining of the first system is finished, in order to transfer workpiece W from first workpiece main spindle device 3 to second workpiece main spindle device 4, for example, both devices approach the center of the machine body, so that workpiece W is regripped by chuck mechanisms 11. In the second system of second workpiece main spindle device 4, similarly to the machining of the first system, workpiece W is machined by second turret device 6, and the machining by tool main spindle device 2 is also performed depending on the machining content. At this time, in tool main spindle device 2, tool T of main spindle head 26 is pivoted by the driving of B-axis motor 28, so that workpiece W of second workpiece main spindle device 4 is machined.

Incidentally, a tool management program is stored in control device 50. A total usage time of tool T (turret tool) attached to first and second turret devices 5 and 6 is calculated from the time period during which workpiece W is actually machined, and notification processing is performed to the operator such as monitor-displaying an instruction to exchange tool T by comparison with a preset lifetime. In first and second turret devices 5 and 6, the machining of the first system and the machining of the second system are clearly distinguished from each other, and the life of tool T (turret tool) mounted on turret 21 is determined. However, since tool T (main spindle head tool) attached to tool main spindle device 2 is used for both the machining of the first system and the machining of the second system, a correct life determination cannot be made by calculating the usage time for each machining in each system.

Figure 5:
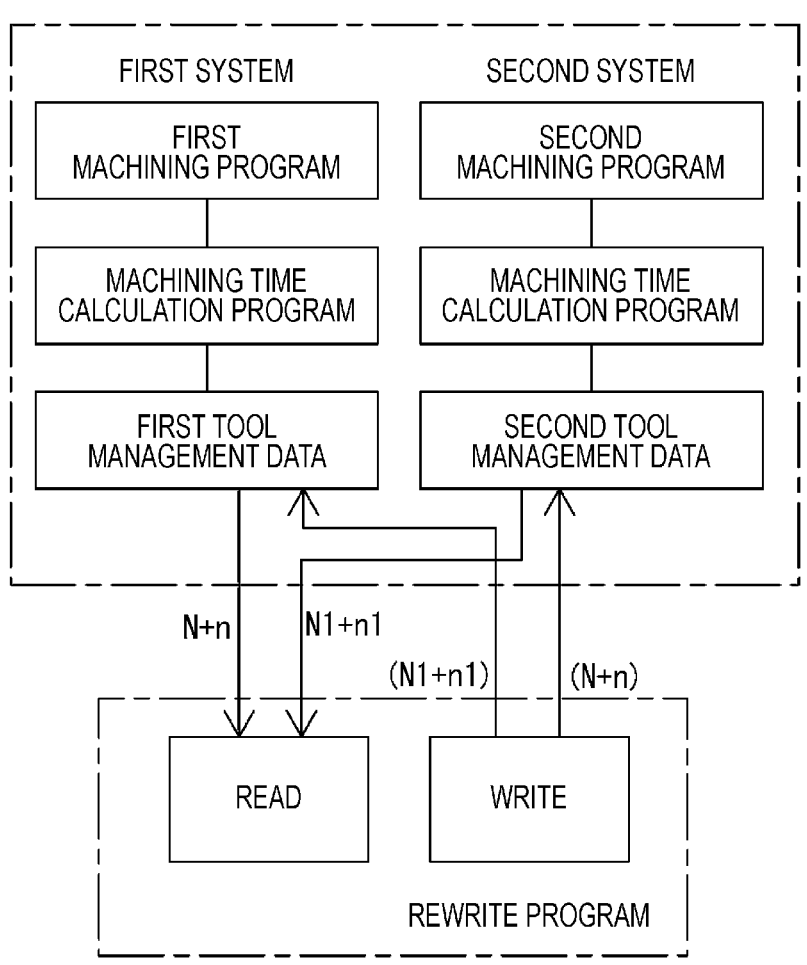
FIG. 5 conceptually illustrates an ATC tool management program processing.

Therefore, in the present embodiment, an ATC tool management program for managing the life of tool T of automatic tool exchanging device (ATC) 8 that performs the tool exchange with respect to tool main spindle device 2 is stored in control device 50. Specifically, the tool management data recorded in different storage areas of the first system and the second system are configured to be unified by reading and writing of a rewrite program stored in PLC 56 illustrated in FIG. 5. It should be noted that FIG. 5 conceptually illustrates the ATC tool management program processing in control device 50.

First, control device 50 stores various machining programs corresponding to the machining contents of workpiece W executed by tool main spindle device 2. In particular, with respect to tool main spindle device 2, various first machining programs in the machining of the first system and various second machining programs in the machining of the second system are provided separately. In addition, a machining time calculation program for calculating the time period during which tool T actually performed the machining of workpiece W based on the information of such a machining program is stored. The machining time calculation program calculates a machining time period that tool T actually contacts workpiece W from information (for example, coordinate information) of the machining program being executed.

In the ATC tool management program, the total usage time from the tool management data to the previous machining is read at the timing of the finish of the machining, and the usage time in the current machining is added to the read value. Then, the total usage time updated and stored as the new tool management data is compared with the lifetime set for the corresponding tool T in advance to determine the life. Such a life determination on tool T is performed for each piece of tool management data recorded in different storage areas of the first system and the second system. However, since one tool T can be used for both the machining of the first system and the machining of the second system in tool main spindle device 2, an accurate life determination cannot be made by using only one usage time.

Therefore, in the ATC tool management program, the total usage time of tool T calculated by the machining of one of the first system and the second system is updated and stored in the tool management data in the other of the systems. That is, the first tool management data of the first system and the second tool management data of the second system are unified. It should be noted that tool T to be mounted on tool main spindle device 2 is managed by a tool number accommodated in tool magazine 43, and the first tool management data and the second tool management data having the same tool number are present in each storage area of the first system and the second system.

In the unification of the first tool management data and the second tool management data, for example, when the first machining using tool Tn is first performed by tool main spindle device 2, the machining time period during which tool Tn contacts workpiece W is calculated from the first machining program by the machining time calculation program. When the finishing of the first machining is confirmed according to the machining program, the total usage time of tool Tn is updated as the first tool management data at that timing. That is, total usage time N of tool Tn is read from the storage area according to the tool number, and a value obtained by adding current usage time n, that is, a new total usage time N+n is updated and stored.

The total usage time of tool Tn updated at this time is not only stored as the first tool management data but also updated on the second tool management data side targeting the second machining program. Therefore, for example, a rewrite program for reading and writing is stored in PLC 56, so that the first tool management data and the second tool management data are unified. The rewrite program reads the updated and stored total usage time N+n of tool Tn into PLC 56 at the timing when the machining of the first system is finished. In addition, total usage time N+n of tool Tn is rewritten as the second tool management data in the storage area on the second system side in which the value is prepared for each tool number.

Thereafter, when the machining of the second system in tool main spindle device 2 is performed by same tool Tn, the machining time period during which tool Tn contacts workpiece W is calculated by the machining time calculation program in the same manner from the second machining program. When the finishing of the machining of the second system is confirmed according to the machining program, total usage time N+n (=N1) of tool Tn is read from the storage area according to the tool number at that timing. Then, the value obtained by adding the current usage time n1 to the total usage time N1 is updated and stored as a new total usage time N1+n1. In addition, total usage time N1+n1 updated even after the second machining is finished is read into PLC 56 by reading the rewrite program, and the value is further rewritten as the first tool management data in the storage area on the first system side corresponding to the tool number.

Meanwhile, even in a case where the machining of the second system in tool main spindle device 2 is performed by the exchanged different tool Tm, the rewriting processing is similarly performed. That is, the machining time period during which tool Tm contacts workpiece W is calculated from the second machining program by the machining time calculation program. Then, when the finishing of the machining of the second system is confirmed according to the machining program, the total usage time of tool Tm is updated as the second tool management data in the storage area of the corresponding tool number at that timing. That is, a value obtained by adding current usage time n2 to total usage time N2 is updated and stored as new total usage time N2+n2, the value is read into PLC 56 by reading the rewrite program, and is rewritten as the first tool management data in a storage area on the first system side corresponding to the tool number.

Therefore, since control device 50 stores an ATC tool management program for accurately determining the tool life for the machining of the first system and the second system of tool main spindle device 2, the first tool management data and the second tool management data separated by the first system and the second system can be unified. For example, when the machining of the second system is finished as described above, the total usage time of tool Tn can be accurately calculated by adding current usage time n1 to total usage time N1 including the machining time period performed in the first system. Therefore, even when tool main spindle device 2 uses same tool T in the machining of the first system and the second system as in multifunctional machining machine 1, and the usage time thereof is calculated, it is possible to correctly determine the life of tool T by updating the mutually used times.

Although one embodiment of the present disclosure has been described, the present disclosure is not limited to these, and various modifications can be made without departing from the gist thereof.

For example, in the above embodiment, the total usage time of tool T is calculated, and the updating and storing of the tool management data of one of the systems and the rewriting of the tool management data of the other of the systems are performed after the finishing of the machining when one machining program is finished, but may be performed at a timing when the directions of main spindle heads 26 are changed, that is, at a timing of the switching between the first system and the second system, or at a timing of the tool exchanging in automatic tool exchanging device 8.

REFERENCE SIGNS LIST

1: multifunctional machining machine, 2: tool main spindle device, 3: first workpiece main spindle device, 4: second workpiece main spindle device, 5: first turret device, 6: second turret device, 8: automatic tool exchanging device, 9: workpiece automatic conveyance device, 50: control device

8

The invention claimed is:

1. A machine tool system comprising:
a machine tool comprising:
a first workpiece main spindle device;
a second workpiece main spindle device;
a tool main spindle device configured to:
execute, by an exchangeable main spindle head tool, machining of a first system in the first workpiece main spindle device configured to rotationally hold a workpiece; and
execute, by the exchangeable main spindle head tool, machining of a second system in the second workpiece main spindle device configured to rotationally hold the workpiece; and
a control device including a processor and a memory wherein:
the control device is configured to drive control of the first and second workpiece main spindle devices and the tool main spindle device;
the memory comprises a first tool management data and a second tool management data; and
the processor is configured to:
calculate a total usage time of the main spindle head tool based on the machining of the first system or the machining of the second system executed in the tool main spindle device;
store the calculated total usage time in the first tool management data or second tool management data; and
rewrite the same total usage time in the other of the second tool management data or the first tool management data.

2. The machine tool system according to claim 1, wherein the processor of the control device calculates a machining time period during which the exchangeable main spindle head tool actually contacts a workpiece from information of a machining program for executing the machining in the first system or the second system.

3. The machine tool system according to claim 1, wherein the processor of the control device reads the total usage time of the exchangeable main spindle head tool calculated and stored according to the machining of the first system or the second system from a first one of the stored first tool management data or the stored second tool management data, and writes the total usage time in the other of the second tool management data or the first tool management data as the total usage time in the exchangeable main spindle head tool.

4. The machine tool system according to claim 1, wherein the processor of the control device rewrites the total usage time of the exchangeable main spindle head tool every time a machining program in the first system or the second system is finished.

* * * * *